(12) United States Patent
Park et al.

(10) Patent No.: US 7,419,843 B2
(45) Date of Patent: Sep. 2, 2008

(54) METHOD OF MANUFACTURING SEMICONDUCTOR PROBE HAVING RESISTIVE TIP

(75) Inventors: Chul-min Park, Suwon-si (KR); Hong-sik Park, Seoul (KR); Hyoung-soo Ko, Seoul (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 11/212,605

(22) Filed: Aug. 29, 2005

(65) Prior Publication Data

US 2006/0057757 A1  Mar. 16, 2006

(30) Foreign Application Priority Data

Aug. 27, 2004  (KR)  ........................ 10-2004-0068007

(51) Int. Cl.
*H01L 21/00*  (2006.01)
(52) U.S. Cl. ............................. 438/48; 438/52; 438/20; 438/738

(58) Field of Classification Search ................... 438/52, 438/542, 48, 20, 689, 736, 738, 739
See application file for complete search history.

(56) References Cited

U.S. PATENT DOCUMENTS

| 5,595,942 | A * | 1/1997 | Albrecht et al. | ............... 438/52 |
| 6,423,239 | B1 * | 7/2002 | Cathey et al. | ................. 216/11 |
| 7,008,811 | B2 * | 3/2006 | Park et al. | ..................... 438/48 |
| 7,141,999 | B2 * | 11/2006 | Park et al. | ................... 324/762 |
| 2003/0119220 | A1 * | 6/2003 | Mlcak et al. | .................. 438/52 |
| 2005/0167724 | A1 * | 8/2005 | Choi et al. | ................... 257/308 |
| 2006/0094241 | A1 * | 5/2006 | Park et al. | ................... 438/689 |
| 2006/0252172 | A1 * | 11/2006 | Park et al. | ..................... 438/48 |

* cited by examiner

*Primary Examiner*—Tuan H Nguyen
(74) *Attorney, Agent, or Firm*—Sughrue Mion, PLLC

(57) ABSTRACT

A method of manufacturing a semiconductor probe having a resistive tip. The method includes forming first and second mask films having a rectangular shape on a silicon substrate, first etching an upper surface of the silicon substrate, forming a third mask film corresponding to a width of a tip neck by etching the first mask film, forming the width of the tip neck to a predetermined width by second etching of the silicon substrate using the third mask film as a mask, and forming a peak forming portion of the tip by annealing the silicon substrate after removing the third mask film. A semiconductor probe having a uniform height and tips having a uniform neck width can be manufactured.

10 Claims, 9 Drawing Sheets

FIG. 5

METHOD OF MANUFACTURING SEMICONDUCTOR PROBE HAVING RESISTIVE TIP

This application claims the priority of Korean Patent Application No. 2004-0068007, filed on Aug. 27, 2004, in the Korean Intellectual Property Office, the disclosure of which is incorporated herein in its entirety by reference.

BACKGROUND OF THE INVENTION

1. Field of the Invention

The present invention relates to a method of manufacturing a semiconductor probe having resistive tips of uniform height.

2. Description of the Related Art

As the demand for compact electronic devices such as portable communication terminals increases, there is a need for ultra compact and highly integrated nonvolatile recording media. A conventional hard disc can not be easily made into compact form, and high integration of flash memory is hard to achieve. Therefore, an information storing device using a scanning probe has been proposed.

A scanning probe is used in a variety of Scanning Probe Microscopy (SPM) techniques. For example, the scanning probe is used in a Scanning Tunneling Microscope (STM) that reproduces information by detecting current flowing between the scanning probe and a sample, an Atomic Force Microscope (AFM) that utilizes atomic force between the scanning probe and a sample, a Magnetic Force Microscope (MFM) that makes use of force between a magnetic field and the magnetized scanning probe, a Scanning Near-Field Optical Microscope (SNOM) that overcomes a resolution limit due to the wavelength of visible light, and an Electrostatic Force Microscope (EFM) using electrostatic force between a probe and a sample.

In order to record and reproduce information with high speed and high density using the SPM technique, surface charges on a small region having a diameter on the order of tens of nanometers must be detected, and cantilevers must be manufactured in an array for improving recording and reproducing speed.

International patent publication No. WO 03/096409 discloses a method of manufacturing a semiconductor probe having a resistive tip. The method includes forming a mask in a stripe shape on a substrate, and forming a resistive region under the mask through ion implantation and an annealing process. Next, a mask in a rectangular shape is formed by etching the mask using a photomask having a strip shape, which is perpendicular to the mask, and tips in which the resistive region is self-aligned is formed by etching the substrate using the rectangularly shaped mask.

Figure 1:
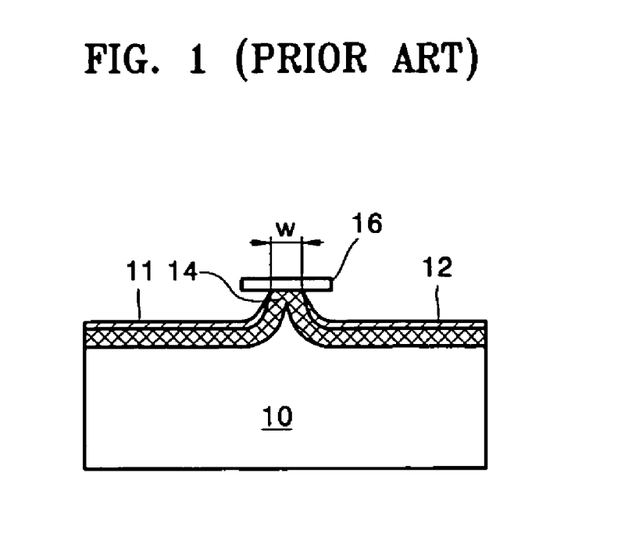
FIG. 1 illustrates a conventional method of forming resistive tips using a mask having a rectangular shape.

FIG. 1 is a drawing which illustrates a conventional method of forming a resistive tip using a mask having a rectangular shape;

Referring to FIG. 1, when etching an upper surface of the substrate 10 using a rectangularly shaped mask 16 having a width of approximately 2 µm, a peak forming portion composed of electrode regions 11 and 12 and a resistive region 14 is formed. At this time, the width W of a tip neck formed under the mask 16 varies according to the degree of etching. The width W of the tip neck is an important parameter for determining the height of the tip. The height of the tip can vary according to the width W of the tip neck when performing a thermal oxidation process for forming a sharp peak after removing the rectangular mask 16. In a scanning probe device using a plurality of cantilevers in an array, the height of the tips must be uniform. If the height of the tips is not uniform, there is a problem in simultaneously reading and writing with the cantilevers. In order to adjust the height of the tip to approximately 1 µm, the width W of the tip neck can be managed to approximately 300 nm. The width W of the tip neck during an etching process is measured by a faint shadow through the mask 16 using an optical microscope.

However, measurement of the width W of the tip neck using an optical microscope is not correct since the width W of the tip neck is estimated by a faint shadow. Therefore, there is a drawback in that the height of the tip is not manufactured within the desired range.

SUMMARY OF THE INVENTION

Accordingly, an object of the present invention is to provide a method of manufacturing a semiconductor probe having a uniform height.

The above object of the present invention has been achieved by providing a method of manufacturing a semiconductor probe having a resistive tip, the method comprising sequentially forming first and second mask films on a silicon substrate doped with a first dopant and forming first and second semiconductor electrode regions by highly doping a second dopant on a region of the silicon substrate except the first and second mask films, annealing the silicon substrate to form resistive regions lightly doped with the second dopant on an outer region of the first and second semiconductor electrode regions, patterning the first and second mask films in a predetermined shape, forming a tip neck portion having a first width under the first mask film by etching an upper surface of the silicon substrate except the patterned first and second mask films, forming a third mask film corresponding to the tip neck portion by etching the exposed first mask film, forming a width of the tip neck to a predetermined second width by etching the silicon substrate using the third mask film as a mask after removing the second mask film, forming a resistive tip by annealing the silicon substrate after removing the third mask film, and etching the silicon substrate to form a cantilever so that the resistive tip is disposed on an end portion of the cantilever, wherein the first and second mask films have different etch selectivities.

The annealing step may include diffusing the first and second semiconductor electrode regions to obtain resistive regions which contact each other to form a peak forming portion of the tip.

The step of patterning of the first and second mask films may include forming mask films in a rectangular shape by performing an etching process after forming a stripe shaped photoresist layer perpendicular to the mask films.

The step of forming of the width of the tip neck to a predetermined second width can further comprise measuring the first width using an in-line scanning electron microscope, and forming the width of the tip neck portion to the predetermined second width by etching an upper surface of the silicon substrate using the third mask film as a mask when the first width is greater than the second width.

The step of forming of the resistive tip may include forming an oxide film having a predetermined thickness at a surface of the silicon substrate and forming a peak forming portion of the tip through contact of the resistive regions by annealing the silicon substrate from which the third mask film is removed, and sharpening the peak forming portion by removing the oxide film.

The first mask film may comprise silicon oxide and the second mask film may comprise silicon nitride.

The first mask film may comprise silicon nitride and the second mask film may comprise silicon oxide.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which embodiments of the present invention are shown. However, the present invention should not be construed as being limited thereto. In the drawings, the thicknesses of layers and regions are exaggerated for clarity.

Figure 2:
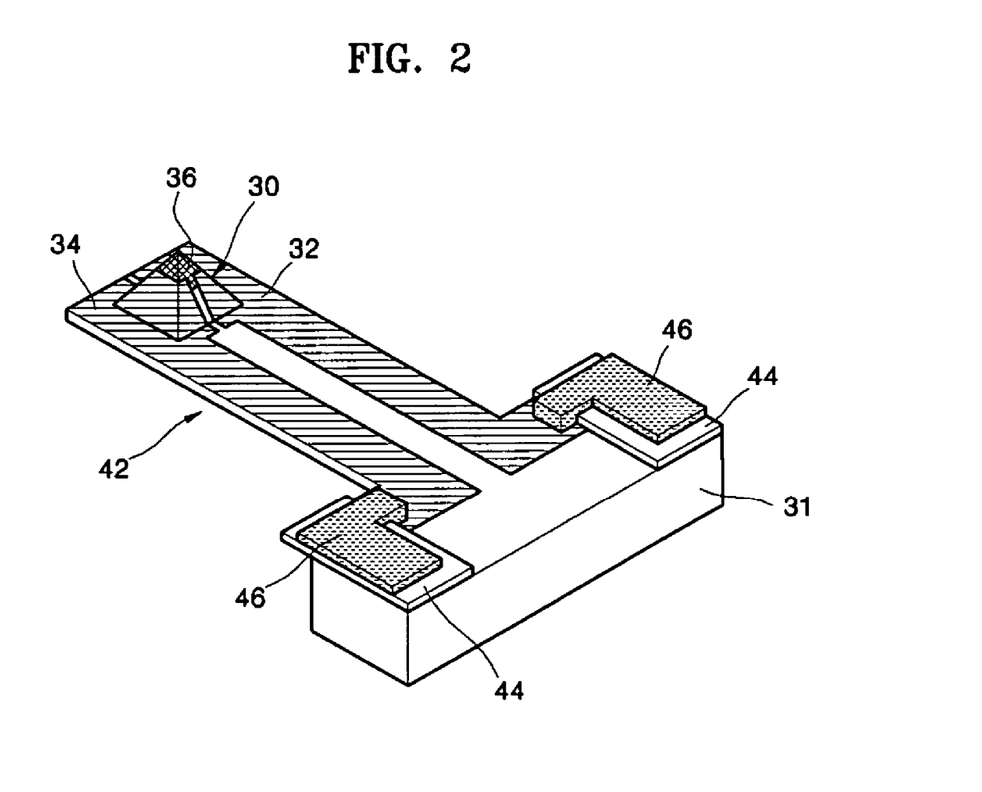
FIG. 2 is a perspective view illustrating a structure of a semiconductor probe having resistive tips fabricated according to the present invention.

FIG. 2 is a perspective view illustrating a structure of a semiconductor probe having resistive tips fabricated according to the present invention.

Referring to FIG. 2, insulating layers 44 are formed on a silicon substrate 31 and metal electrodes 46 are formed on the insulating layers 44. A cantilever 42 is formed extending from a surface of the silicon substrate 31 doped with a first dopant, and a resistive tip 30 having a pyramidal shape extends in a vertical direction from a surface of an end of the cantilevers 42. First and second semiconductor electrode regions 32 and 34 highly doped with a second dopant are formed on a slope of the resistive tip 30, and a resistive region 36 lightly doped with the second dopant is formed at a peak of the resistive tip 30. The first and second semiconductor electrode regions 32 and 34 are electrically connected to the resistive region 36 and connected to the metal electrode 46 through the cantilevers 42.

FIGS. 3A through 3M illustrate a method of manufacturing a semiconductor probe according to an embodiment of the present invention.

First, a first mask film 33, such as a silicon oxide film, is formed on a surface of the silicon substrate 31 doped with a first dopant, and a second mask film 35, such as a silicon nitride film, is formed on the first mask film 33. The first and second mask films 33 and 35 are formed of different materials having different etching selectivities. Photoresist layer 37 is deposited on the second mask film 35. A stripe shaped mask 38 is disposed over the photoresist 37 (refer to FIG. 3A).

Figure 3A:
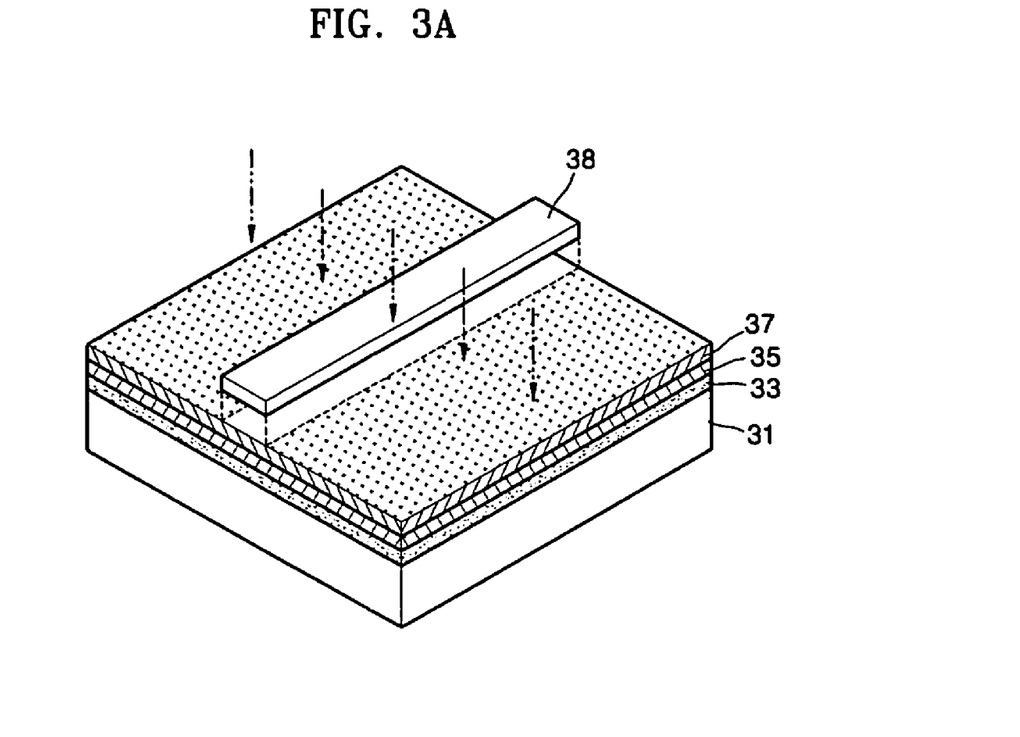
FIGS. 3A through 3M illustrate a method of manufacturing a semiconductor probe according to an embodiment of the present invention.
Figure 3B:
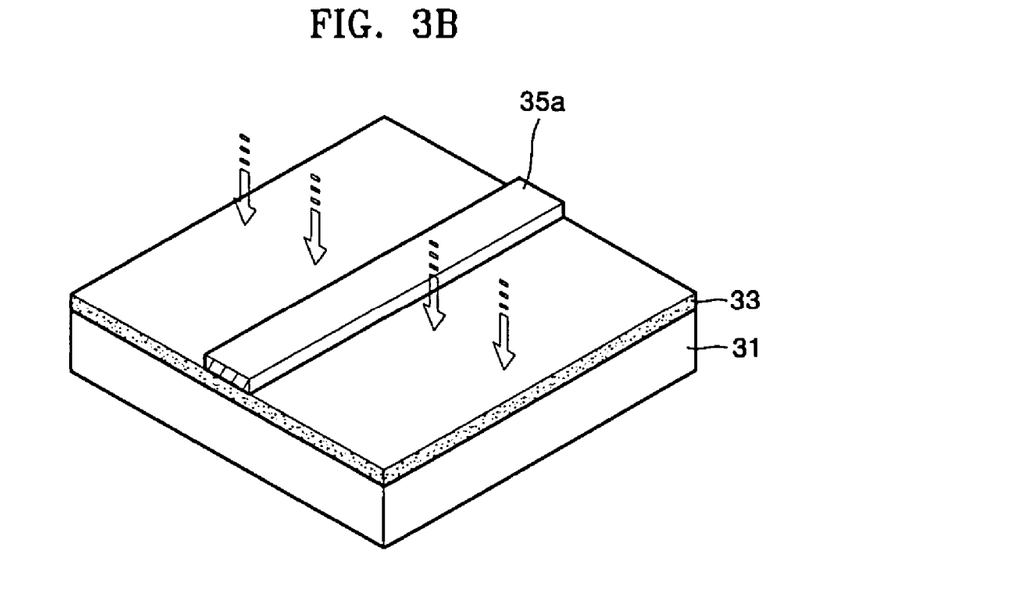
Figure 3C:
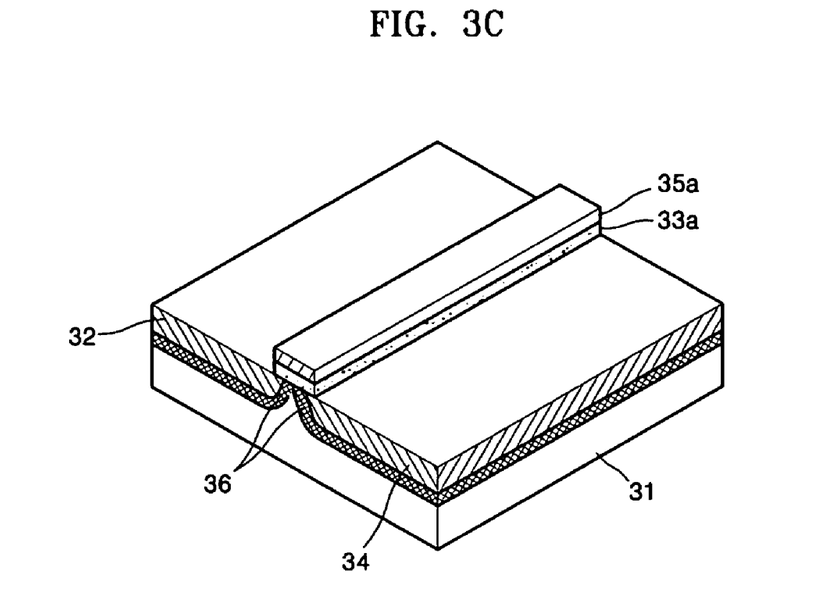

Next, the photoresist layer 37 is patterned by performing exposing, developing, and etching processes using the mask 38. As depicted in FIG. 3B and FIG. 3C, a first mask film 33a and a second mask film 35a having a stripe shape are formed. The widths of the first mask film 33a and the second mask film 35a are formed to approximately 2 µm. The first and second semiconductor electrode regions 32 and 34, as depicted in FIG. 3B and FIG. 3C, are formed by highly doping the silicon substrate 31 with the second dopant except in a region below the first mask film 33a. The highly doped first and second semiconductor electrode regions 32 and 34 serve as conductors since they have a very low specific resistance.

Next, a width between the first and second semiconductor electrode regions 32 and 34 is reduced to less than the width of the mask film 33a by performing an annealing process. As depicted in FIG. 3C, when the first and second semiconductor electrode regions 32 and 34, which are highly doped with the second dopant, expand, a lightly doped region, that is, a resistive region 36 is formed by diffusion of the second dopant into a region adjacent to the highly doped region. The resistive region 36 under the first mask film 33a forms a peak forming portion of the resistive tip which will be described below. Alternatively, the process of forming the peak forming portion can be performed using a thermal oxidation process.

Figure 3D:
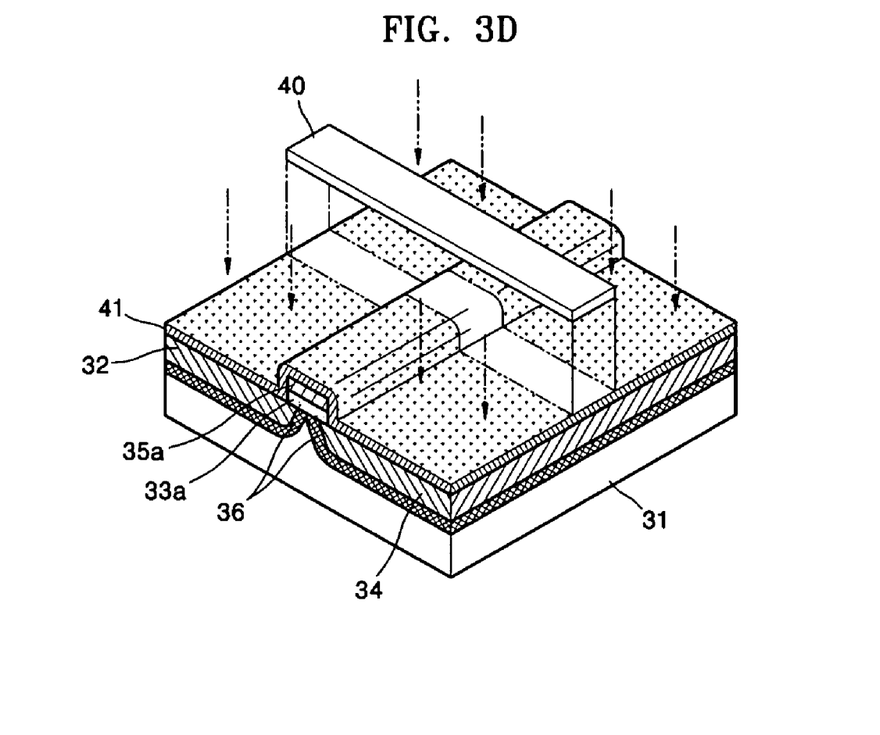
Figure 3E:
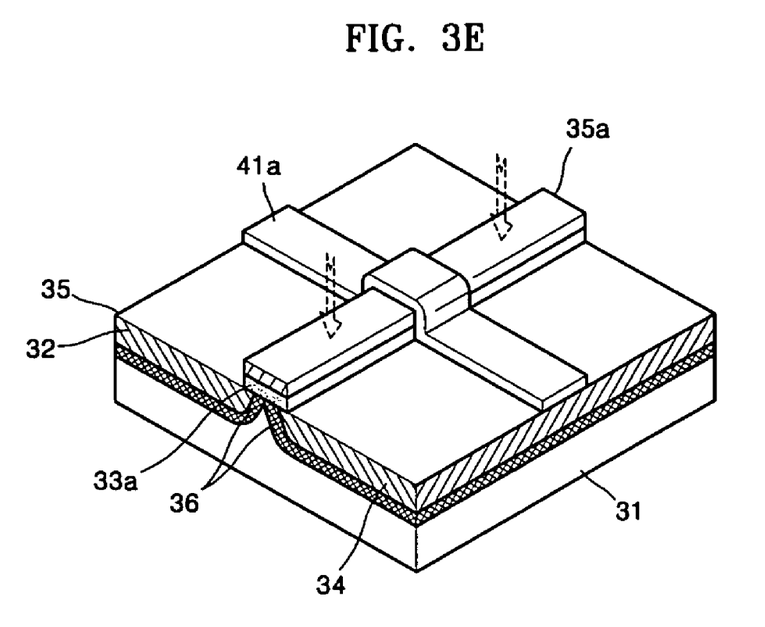

Next, photoresist layer 41 is deposited on the silicon substrate 31 to cover the first and second mask films 33a and 35a, and as depicted in FIG. 3D, a stripe shaped photomask 40 is disposed over the first and second mask films 33a and 35a in a direction perpendicular to the mask films 33a and 35a. Then, a photoresist layer 41a having the same shape as the photomask 40 is formed by exposing and developing photoresist layer 41.

Figure 3F:
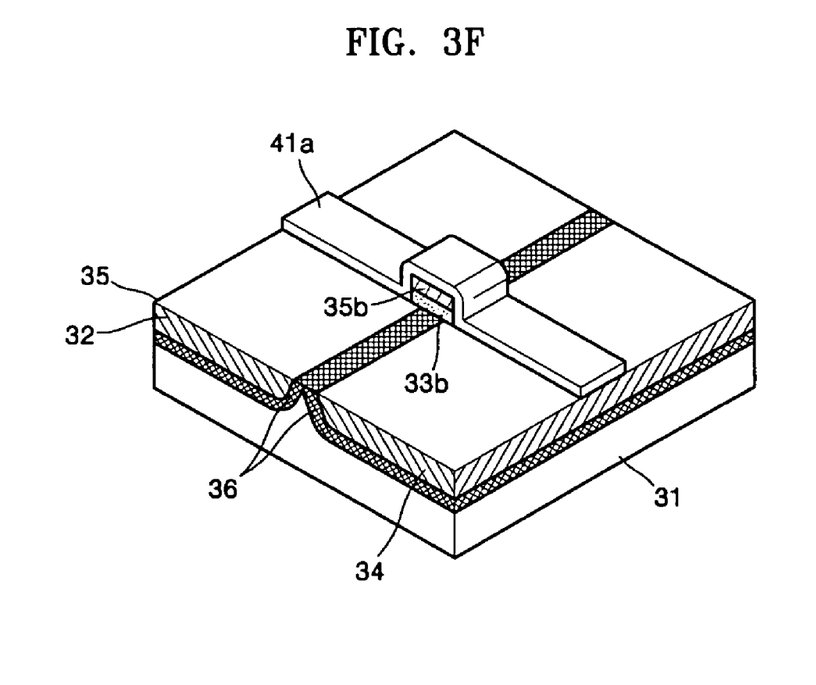

Next, mask films 33b and 35b having a rectangular shape are formed by sequentially etching the first and second mask films 33a and 35a which are not covered by the photoresist layer 41a (refer to FIG. 3F).

Figure 3G:
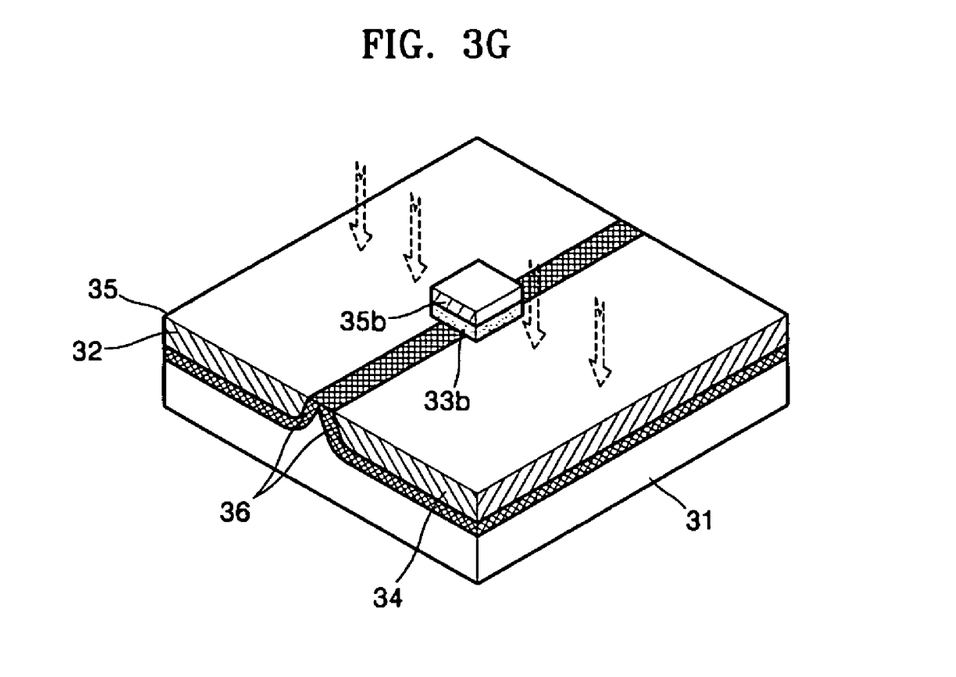
Figure 3H:
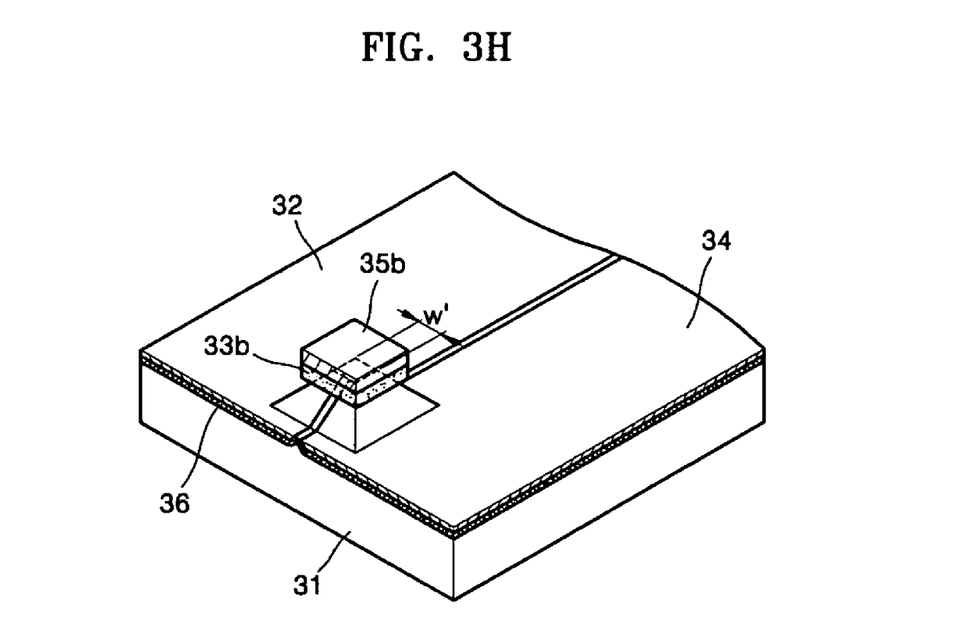
Figure 3I:
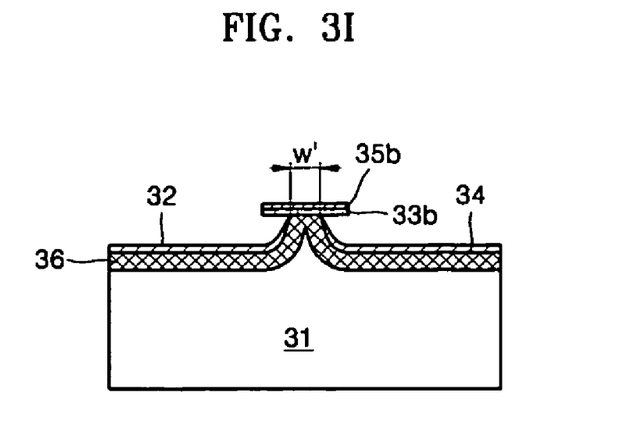

Next, as depicted in FIG. 3G, after removing the photoresist layer 41a, the silicon substrate 31 is wet or dry etched using the mask films 33b and 35b. At this time, a first etching is performed for a predetermined period of time to achieve a width of the tip neck greater than 300 nm which is a target width. FIGS. 3H and 3I respectively are a perspective view and a cross-sectional view illustrating the resultant product of the first etching. The width W' of the tip neck of the etched product can be observed using an optical microscope, but an accurate width W' of the tip neck cannot be determined with the optical microscope.

Figure 3J:
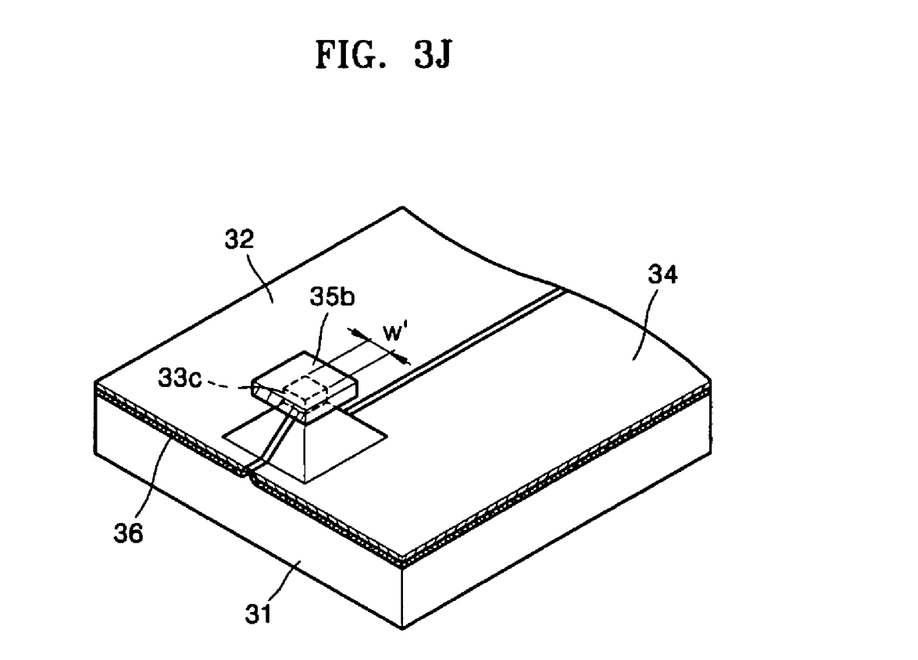
Figure 3K:
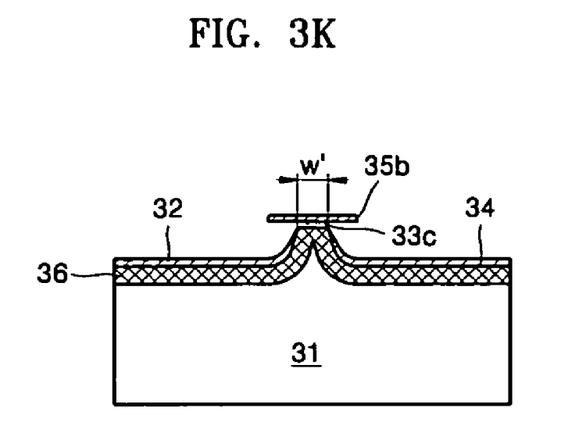

Next, an exposed portion of the first mask film 33b is removed by selectively etching the first mask film 33b. As depicted in FIGS. 3J and 3K, a third mask film 33c which is a portion corresponding to the width W' of the tip neck is formed.

Figure 3L:
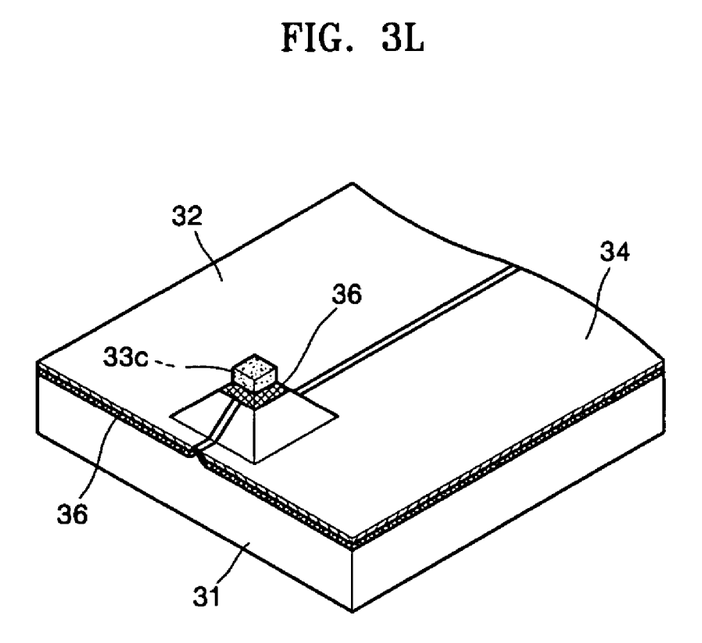

When the second mask film 35b is etched, as depicted in FIG. 3L, only the third mask film 33c corresponding to the tip neck remains.

Next, the width W' of the tip neck can be measured accurately using an in-line scanning electron microscope (SEM). When the width W' of the tip neck is determined to be greater than 300 nm, the upper surface of the silicon substrate 31 is etched a second time. The second etching can be repeated by observing the width W' of the tip neck using the SEM. Accordingly, the width W' of the tip neck of the resultant product can be controlled close to 300 nm, which is the target width.

Next, after removing the third mask film 33c, when annealing the silicon substrate 31 under an oxidized atmosphere, a silicon oxide film (not shown) having a predetermined thickness is formed on an upper surface of the silicon substrate 31. When the silicon oxide film is removed, the peak forming portion becomes tapered. That is, a peak of the tip 30 is formed. While performing the thermal oxidation process, the separated resistive region 36 is diffused to form the peak forming portion and sharpening the tip 30 can be performed at the same time.

Figure 3M:
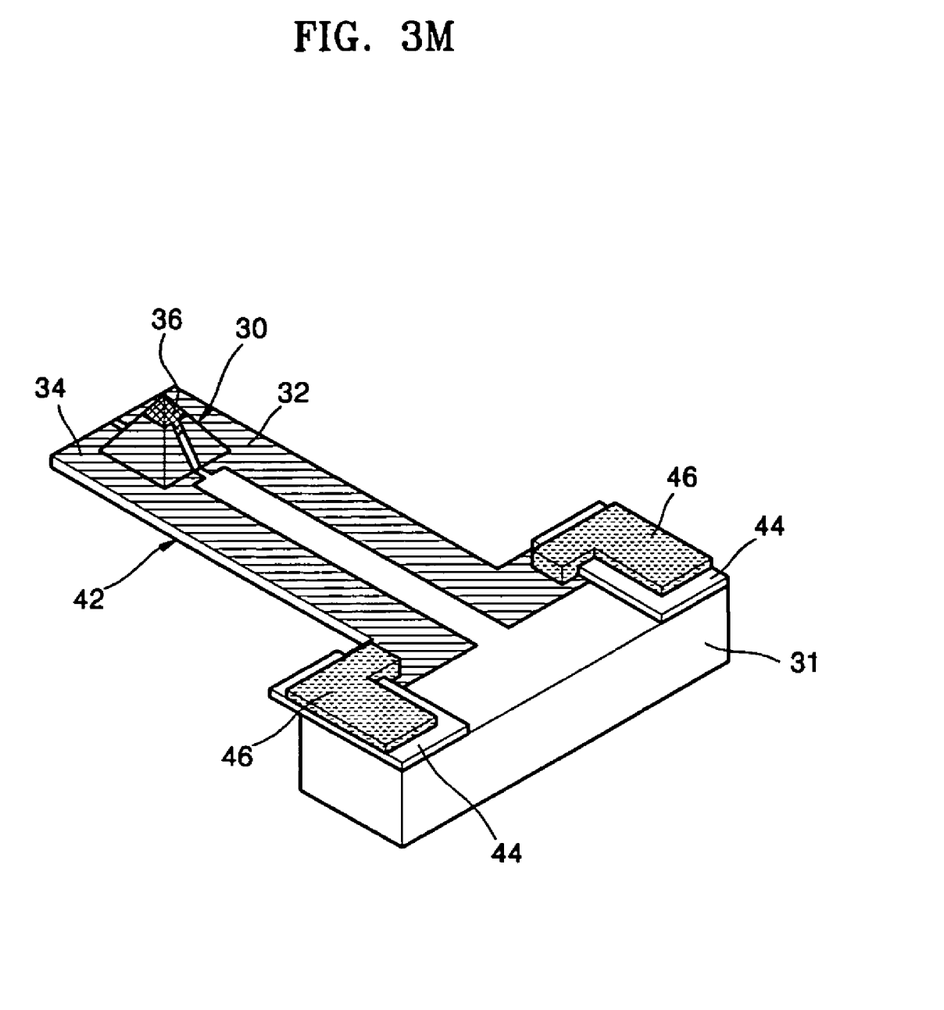

Next, a cantilever 42 is formed so as to dispose the tip 30 on an end by etching the silicon substrate 31 using a conventional semiconductor process. Afterwards, a semiconductor probe as depicted in FIG. 3M is obtained by connecting the first and second semiconductor electrode regions 32 and 34 to the electrode pad 46 which is insulated by the insulating layer 44 on the silicon substrate 31.

In the method of manufacturing the semiconductor probe according to an embodiment of the present invention, a simple photo etching process can be performed before manufacturing the tip 30 by ion implanting the first and second semiconductor electrode regions 32 and 34, and the resistive region 36 can be readily formed by a thermal diffusion process.

Figure 4:
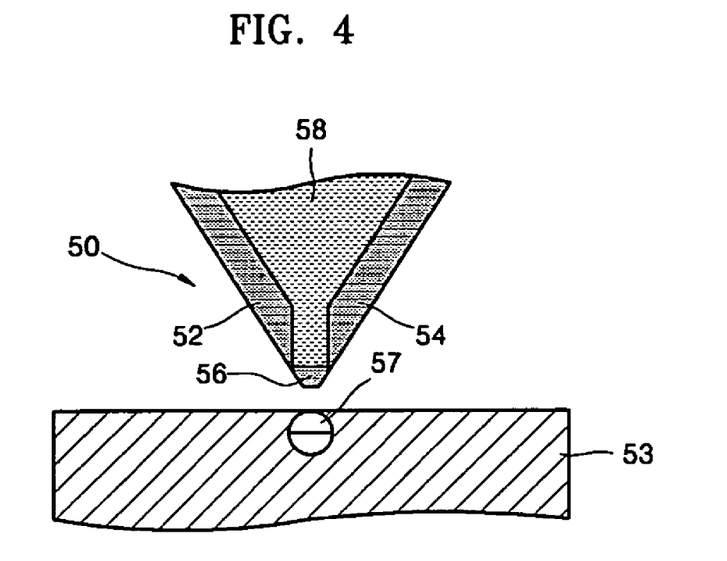
FIGS. 4 and 5 illustrate operation of the resistive tips fabricated according to the manufacturing method of the present invention.

FIG. 4 illustrates a tip portion of the semiconductor probe having a resistive tip fabricated according to the present invention.

Referring to FIG. 4, a tip 50 of a semiconductor probe includes a body 58 of the tip 50 doped with a first dopant, a resistive region 56 formed by lightly doping a second dopant and disposed on a peak of the tip 50, and first and second semiconductor electrode regions 52 and 54 highly doped with the second dopant and formed on a sloped surface of the tip 50 having the resistive region 56 therebetween. If the first dopant is a p-type dopant, the second dopant is an n-type dopant, and if the first dopant is an n-type dopant, the second dopant is a p-type dopant.

The charge difference of the surface charge 57 of a recording medium 53 causes a difference in magnitude of an electric field, and the difference in magnitude of the electric field causes a difference in the resistance value of the resistive region 56. The difference in resistance value is a basis for detecting the polarity and magnitude of the surface charge.

Figure 5:
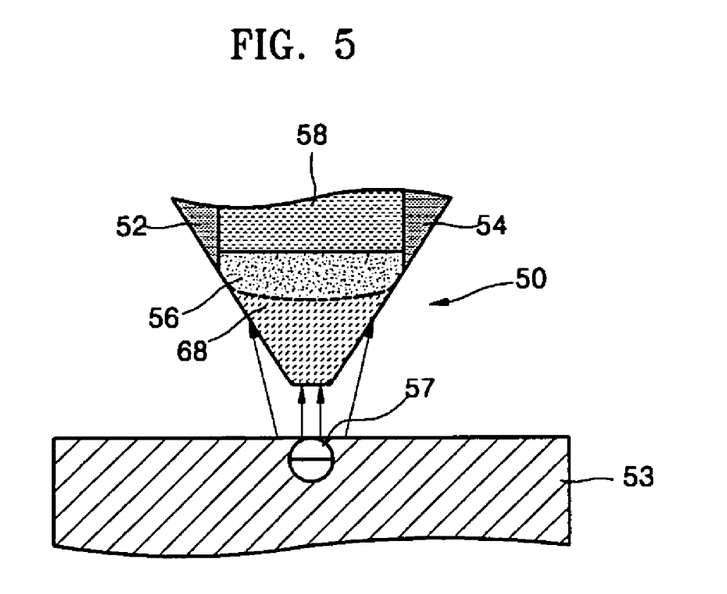

FIG. 5 is a magnified end portion of the tip 50 of the semiconductor probe in FIG. 4.

Referring to FIG. 5, a depletion region 68 formed in the resistive region 56 gradually expands into the first and second semiconductor electrode regions 52 and 54 by an electric field which is generated by a surface negative charge 57. The resistive tip 50 can detect the polarity and magnitude of the surface charge 57 even though the depletion region 68 does not expand into the first and second semiconductor electrode regions 52 and 54. This is because a change in resistance value of the resistive region 56 occurs due to reduction of the resistive region 56 by the depletion region 68 which is a non-conductor. The semiconductor probe according to an embodiment of the present invention has superior sensitivity than a conventional probe. This is because the tip of the semiconductor probe has a low threshold electric field value compared to that of a conventional FET tip.

According to the method of manufacturing a semiconductor probe having a resistive tip of the present invention, the resistive region disposed between the semiconductor electrode regions can be formed on a center of the tip end by the aforementioned self-aligning method. Also, the manufacturing process is simplified since the resistive region lightly doped with a dopant can be formed by a thermal diffusion process.

Also, tips of uniform height can be obtained by performing a tip sharpening process after forming a uniform tip neck using first and second masks each having different etch selectivities. Accordingly, the tip can be applied to an information storage device that performs multiple read and write operations by forming tips of uniform height on a cantilever array.

Also, when the probe fabricated in the aforementioned method is used in a large capacity and in an ultra mini information storage device using a scanning probe technique, the probe can be used as a device that can record and reproduce information by detecting charges in a small region.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of manufacturing a semiconductor probe having a resistive tip, comprising:

sequentially forming first and second mask films on a silicon substrate doped with a first dopant and forming first and second semiconductor electrode regions by highly doping a second dopant on a region of the silicon substrate except the first and second mask films;

annealing the silicon substrate to form resistive regions lightly doped with the second dopant on an outer region of the first and second semiconductor electrode regions;

patterning the first and second mask films in a predetermined shape;

forming a tip neck portion having a first width under the first mask film by etching an upper surface of the silicon substrate except the patterned first and second mask films;

forming a third mask film corresponding to the tip neck portion by etching the exposed first mask film;

forming a width of the tip neck to a predetermined second width by etching the silicon substrate using the third mask film as a mask after removing the second mask film;

forming a resistive tip by annealing the silicon substrate after removing the third mask film; and etching the silicon substrate to form a cantilever so that the resistive tip is disposed on an end portion of the cantilever, wherein the first and second mask films have different etch selectivities.

2. The method of claim 1, wherein said annealing comprises diffusing the first and second semiconductor electrode regions to obtain resistive regions which contact each other to form a peak forming portion of the tip.

3. The method of claim 2, wherein said forming a resistive tip includes:

forming an oxide film having a predetermined thickness at a surface of the silicon substrate by annealing the silicon substrate from which the third mask film is removed; and sharpening the peak forming portion by removing the oxide film.

4. The method of claim 1, wherein said patterning of the first and second mask films includes forming mask films in a rectangular shape by performing an etching process after forming a stripe shaped photoresist layer perpendicular to the mask films.

5. The method of claim 1, wherein said forming a width of the tip neck to a predetermined second width further comprises:

measuring the first width using an in-line scanning electron microscope; and forming the width of the tip neck portion to the predetermined second width by etching an upper surface of the silicon substrate using the third mask film as a mask when the first width is measured as being greater than the second width.

6. The method of claim 1, wherein said forming a resistive tip includes forming an oxide film having a predetermined thickness at a surface of the silicon substrate and forming a peak forming portion of the tip through contact of the resistive regions by annealing the silicon substrate from which the third mask film is removed.

7. The method of claim 1, wherein said first mask film comprises silicon oxide and said second mask film comprises silicon nitride.

8. The method of claim 1, wherein said first mask film comprises silicon nitride and said second mask film comprises silicon oxide.

9. The method of claim 1, wherein the first dopant is a p-type dopant and the second dopant is an n-type dopant.

10. The method of claim 1, wherein the first dopant is an n-type dopant and the second dopant is a p-type dopant.

* * * * *